(12) United States Patent
Zhang et al.

(10) Patent No.: US 11,808,639 B2
(45) Date of Patent: Nov. 7, 2023

(54) HIGH-PRECISION TEMPERATURE DEMODULATION METHOD ORIENTED TOWARD DISTRIBUTED FIBER RAMAN SENSOR

(71) Applicant: TAIYUAN UNIVERSITY OF TECHNOLOGY, Taiyuan (CN)

(72) Inventors: Mingjiang Zhang, Taiyuan (CN); Jian Li, Taiyuan (CN); Jianzhong Zhang, Taiyuan (CN); Lijun Qiao, Taiyuan (CN); Tao Wang, Taiyuan (CN); Yuncai Wang, Taiyuan (CN); Baoquan Jin, Taiyuan (CN); Yu Wang, Taiyuan (CN); Dong Wang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 541 days.

(21) Appl. No.: 17/252,995

(22) PCT Filed: May 5, 2019

(86) PCT No.: PCT/CN2019/000087
§ 371 (c)(1),
(2) Date: Dec. 16, 2020

(87) PCT Pub. No.: WO2020/034558
PCT Pub. Date: Feb. 20, 2020

(65) Prior Publication Data
US 2021/0270682 A1    Sep. 2, 2021

(30) Foreign Application Priority Data

Aug. 13, 2018  (CN) .......................... 201810913070.4

(51) Int. Cl.
*G01K 11/324* (2021.01)

(52) U.S. Cl.
CPC .................................. *G01K 11/324* (2021.01)

(58) Field of Classification Search
CPC ..... G01K 11/324; G01K 15/005; G01K 11/32
See application file for complete search history.

(56) References Cited

U.S. PATENT DOCUMENTS

| 5,765,948 A | 6/1998 | Sai |
| 10,416,085 B2 * | 9/2019 | Su .......................... G01K 11/00 |
| 2018/0180510 A1 * | 6/2018 | Su .......................... G01K 11/32 |

FOREIGN PATENT DOCUMENTS

| CN | 102279062 A | 12/2011 |
| CN | 202582784 U | 12/2012 |

(Continued)

OTHER PUBLICATIONS

Zhang et al., Recent progress in distributed optical fiber raman sensors, 2012, SPIE) (Year: 2012).*

(Continued)

*Primary Examiner* — Mohammad K Islam
(74) *Attorney, Agent, or Firm* — Lando & Anastasi, LLP

(57) ABSTRACT

A temperature demodulation method oriented toward a distributed fiber Raman temperature sensing system, the method comprising the following steps: step 1 of constructing a high-precision temperature detection device oriented towards a distributed fiber Raman sensing system; step 2 of performing signal processing with respect to Stokes light and anti-Stokes light at a calibration stage; step 3 of performing signal processing with respect to Stokes light and the anti-Stokes light at a measurement stage; and step 4 of obtaining a high-precision temperature demodulation technique oriented toward the distributed fiber Raman sensor. The method is used to effectively resolve the issue of low temperature measuring accuracy caused by Rayleigh crosstalk in existing distributed fiber Raman temperature measurement systems, and temperature measurement accuracy (Continued)

thereof is expected to fall within ±0.1° C. The method is applicable to distributed fiber Raman temperature measurement systems.

2 Claims, 1 Drawing Sheet

(56) References Cited

FOREIGN PATENT DOCUMENTS

| CN | 104344913 A | 2/2015 |
|---|---|---|
| CN | 104748887 A | 7/2015 |
| CN | 204612831 U | 9/2015 |
| CN | 105953941 A | 9/2016 |
| CN | 106323499 A | 1/2017 |
| CN | 106404217 A | 2/2017 |
| CN | 107421657 A | 12/2017 |
| CN | 107843357 A | 3/2018 |
| CN | 108871607 A | 11/2018 |
| EP | 2966426 A1 | 1/2016 |
| JP | 103108627 A | 5/1991 |
| JP | 2007240174 A | 9/2007 |
| WO | 2020034558 A1 | 2/2020 |

OTHER PUBLICATIONS

Zhang et al. (Recent Progress in Distributed Optical Fiber Raman Photon Sensors at China Jiliang University, 2011) (Year: 2011).*
Dyer et al. (High Spatial Resolution Distributed Fiber Sensor Using Raman Scattering in Single-Mode Fiber, 2010). (Year: 2010).*
Wang et al. (Spatial Resolution Improvement of Distributed Raman Temperature Measurement System, 2013, IEEE) (Year: 2013).*
International Search Report and Written Opinion from corresponding International Application No. PCT/CN2019/000087 dated Jul. 26, 2019.
Search Report from Chinese Application No. 201810913070.4 (date unknown).

* cited by examiner

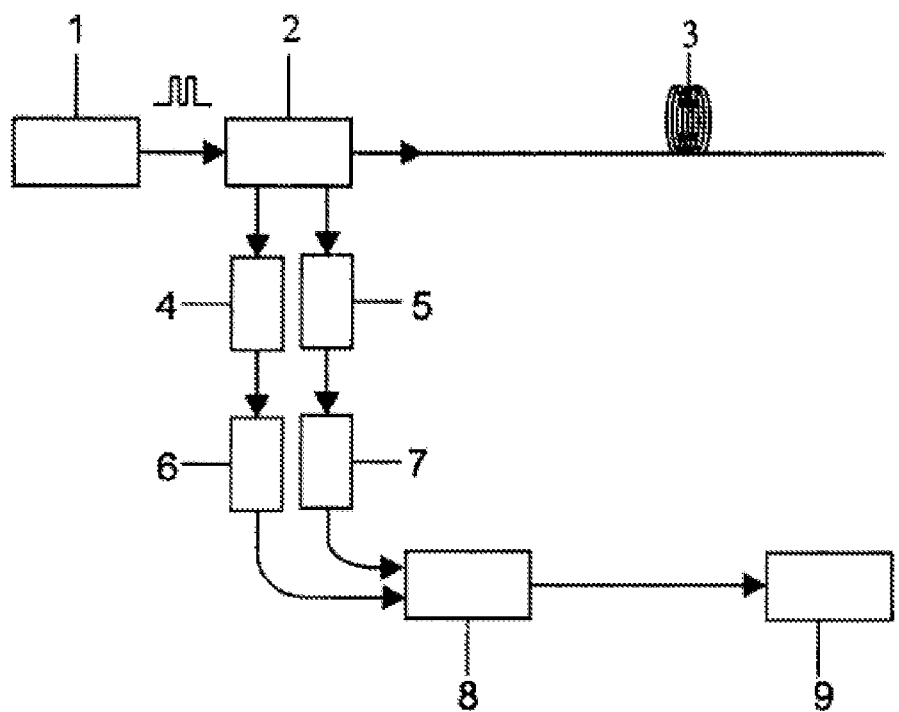

HIGH-PRECISION TEMPERATURE DEMODULATION METHOD ORIENTED TOWARD DISTRIBUTED FIBER RAMAN SENSOR

CROSS-REFERENCE TO RELATED APPLICATIONS

This application is a U.S. National Stage Application under 35 U.S.C. § 371 of International Application No. PCT/CN2019/000087, filed May 5, 2019, titled HIGH-PRECISION TEMPERATURE DEMODULATION METHOD ORIENTED TOWARD DISTRIBUTED FIBER RAMAN SENSOR, which claims priority to Chinese Application No. 201810913070.4, filed Aug. 13, 2018. International Application No. PCT/CN2019/000087 is incorporated by reference herein in its entirety.

TECHNICAL FIELD OF THE DISCLOSURE

The present disclosure relates to the field of temperature demodulation in a fiber sensing system, and in particular, relates to a high-precision temperature demodulation method oriented to a distributed fiber Raman sensor.

BACKGROUND

A distributed fiber sensor is a source of industrial data and is a basis for realizing intelligent transformation and upgrading. The fiber sensing technology has advantages of large-range continuous monitoring, precise positioning of a processing space, timely and accurate fault diagnosis and good expansion and upgrading capability, and it may meet requirements of intelligent manufacturing with complex structure and ever-changing functions. Due to a traditional electronic sensing system being complicated in wiring, the system is easy to occur various problems during using, such as electromagnetic interference, lightning stroke, humid weather interference and the like, thus, the system cannot be widely used in many key areas of intelligent manufacturing, and continuous precision measurement may not be popularized either. Therefore, the new fiber sensing technology has become a key technology for realizing intelligent manufacturing and industrial production chain networking.

In a distributed fiber Raman temperature measurement system, the temperature measurement precision is one of important parameters of system performance. At present, the temperature measurement precision of the distributed fiber Raman sensor is substantially maintained at ±1° C. However, with the development of science and technology, a high requirement for the temperature measurement precision of the fiber sensing system has been put forward in some industrial monitoring fields, such as in the field of temperature monitoring of petrochemical reactor, smart grid, and tunnel water seepage, and the temperature measurement precision is required to reach ±0.1° C. In the distributed fiber Raman temperature measurement system, a temperature demodulation method is a key technology to realize high-precision online monitoring of the temperature along the fiber. A current commonly used method of temperature demodulation is to use Stokes backscattering light as a reference channel and anti-Stokes backscattering light as a signal channel, and then to use a light intensity ratio of the two backscattering light to demodulate temperature information along the fiber. But Stokes scattering signals and anti-Stokes scattering signals in the fiber are very weak, and scattering information is substantially completely submerged in noises. The system separates the anti-Stokes signals and the Stokes signals via a Raman wavelength division multiplexer (WDM). If the WDM cannot realize the filtration function well, then a portion of the Rayleigh scattering light will be doped in the Raman scattering light, and due to the anti-Stokes signal intensity being too weak, residual components of the Rayleigh scattering light will become serious noise interference of the system. At present, the Raman WDM used in practical engineering can usually provide an isolation of 35-40 dB, which has substantially met the requirement of people for high isolation. The Brillouin scattering light in the fiber, after passing through the wavelength division multiplexer, has weaker intensity by several orders of magnitude than the Raman scattering light, which is difficult to cause interference for extracting temperature information of the system and can be ignored. Therefore, this portion of the Rayleigh scattering light which is not filtered by the WDM outputs together with the anti-Stokes scattering light, and passes through the photodetector and the data acquisition card. At this time, the data collected by the system actually contains two components: anti-Stokes scattering signals and Rayleigh scattering signals. In this case, using the data detected by the system to directly perform temperature demodulation is obviously affected by Rayleigh light noises, and a certain degree of error exists compared with the real situation, thus the temperature measurement precision of the system is difficult to reach ±0.1° C. In order to further improve the temperature measurement precision of the system, a targeted data processing algorithm must be proposed, therefore, eliminating the interference of Rayleigh noises has become a key technical problem for realizing the high-precision detection along the fiber.

Based on this, it is necessary to invent a new temperature demodulation method, to solve the problem of low temperature measurement precision of the system caused by the influence of Rayleigh noises on the temperature demodulation of the fiber Raman sensing system.

SUMMARY

In order to solve the problem that the system temperature measurement precision of existing distributed fiber Raman sensing systems drops sharply due to the phenomenon, such as Rayleigh noise interference and other phenomena, the present disclosure provides a high-precision temperature demodulation method oriented to a distributed fiber Raman temperature sensing system, enabling the temperature measurement precision to be expected to reach ±0.1° C.

The present disclosure is realized by using the following technical solutions.

The present disclosure provides a temperature demodulation method oriented to a fiber Raman temperature sensing system, comprising the following steps:

Step 1: Constructing the Above-Mentioned High-Precision Temperature Detection Device Oriented to a Distributed Fiber Raman Sensing System The device includes a pulsed laser, a WDM, two APDs (Avalanche Photodiode), two LNAs (Low-Noise Amplifier), a data acquisition card, and a computer; wherein an output end of the pulsed laser is connected to an input end of the WDM; two output ends of the WDM are respectively connected to input ends of the first APD and the second APD; an output end of the first APD is connected to an input end of the first LNA; an output end of the second APD is connected to an input end of the second LNA; output ends of the first LNA and the second LNA are connected to input ends of the data acquisition card; an output end of the data acquisition card is connected to an input end of the computer; a common end of the WDM is connected to an end of a sensing fiber to be tested.

Step 2: Processing Stokes Light and Anti-Stokes Light Signals at a Calibration Stage Transmitting laser pulses emitted by the pulsed laser to the sensing fiber to be tested; conducting spontaneous Raman scattering when the laser pulses propagate in the multi-mode sensing fiber, such that Stokes light and anti-Stokes light are generated at each position of the multi-mode sensing fiber; wherein backward Stokes light and anti-Stokes light generated in the fiber firstly respectively arrive at the first APD, the first LNA, and the second APD, the second LNA via the WDM and are performed a photoelectric conversion and amplification, finally, enter the high-speed acquisition card and computer to acquire data and to obtain positional and light intensity information of the Stokes light and anti-Stokes light along the fiber.

Before temperature measurement, all of the sensing fiber need to be performed a calibration processing at a constant temperature, and the calibration process is carried out twice in total in a calibration stage. In a first calibration stage, the data acquisition card obtains a backscattering light intensity curve of the anti-Stokes light and Stokes light, whose light intensity ratio is expressed as:

$$\frac{\phi_{a0}}{\phi_{s0}} = \frac{K_a V_a^4}{K_s V_s^4} \exp\left(-\frac{h\Delta v}{kT_{c0}}\right) \exp[(\alpha_s - \alpha_a)l] + P_0 K_r V_0^4 \exp(-2\alpha_o l), \quad (1)$$

where $K_s$, $K_a$ and $K_r$ are coefficients related to a scattering end cross section of the fiber; $V_s$, $V_a$ and $V_0$ are frequencies of the Stokes light, anti-Stokes light and incident light; h and k are Planck Constant and Boltzmann Constant respectively; $\Delta v$ is a Raman frequency offset of the fiber, which is 13.2 THz; $\alpha_s$, $\alpha_a$, $\alpha_0$ are attenuation coefficients of the Stokes light, anti-Stokes light and Rayleigh scattering light per unit length of the fiber, respectively; $T_{c0}$ represents a temperature value of the sensing fiber to be tested in the first calibration stage; l represents a distance between the position and a front end of the multi-mode sensing fiber; and $P_0$ is intensity of the incident light.

In a second calibration stage, the data acquisition card obtains the backscattering light intensity curve of the anti-Stokes light and Stokes light, whose light intensity ratio is expressed as:

$$\frac{\phi_{a1}}{\phi_{s1}} = \frac{K_a V_a^4}{K_s V_s^4} \exp\left(-\frac{h\Delta v}{kT_{c1}}\right) \exp[(\alpha_s - \alpha_a)l] + P_0 K_r V_0^4 \exp(-2\alpha_o l), \quad (2)$$

where $T_{c1}$ represents a temperature value of the sensing fiber to be tested in the second calibration stage.

Step 3: Processing Stokes Light and the Anti-Stokes Light Signals in a Measurement Stage In the measurement stage, the data acquisition card obtains the backscattering light intensity curve of the anti-Stokes light and the Stokes light, whose light intensity ratio is expressed as:

$$\frac{\phi_a}{\phi_s} = \frac{K_a V_a^4}{K_s V_s^4} \exp\left(-\frac{h\Delta v}{kT}\right) \exp[(\alpha_s - \alpha_a)l] + P_0 K_r V_0^4 \exp(-2\alpha_o l), \quad (3)$$

where T represents the temperature value at a position l of the sensing fiber to be tested in the measurement stage.

Step 4: A High-Precision Temperature Demodulation Method Oriented to a Distributed Fiber Raman Sensing System subtracting formula (1) for formula (3) to obtain $$\frac{\phi_a}{\phi_s} - \frac{\phi_{a0}}{\phi_{s0}} = \frac{K_a V_a^4}{K_s V_s^4} \exp[(\alpha_s - \alpha_a)l]\left[\exp\left(-\frac{h\Delta v}{kT}\right) - \exp\left(-\frac{h\Delta v}{kT_{c0}}\right)\right]; \quad (4)$$

subtracting formula (2) from formula (3) to obtain $$\frac{\phi_a}{\phi_s} - \frac{\phi_{a1}}{\phi_{s1}} = \frac{K_a V_a^4}{K_s V_s^4} \exp[(\alpha_s - \alpha_a)l]\left[\exp\left(-\frac{h\Delta v}{kT}\right) - \exp\left(-\frac{h\Delta v}{kT_{c1}}\right)\right]; \quad (5)$$

making a ratio of formula (4) to formula (5) to obtain:

$$\frac{\frac{\phi_a}{\phi_s} - \frac{\phi_{a0}}{\phi_{s0}}}{\frac{\phi_a}{\phi_s} - \frac{\phi_{a1}}{\phi_{s1}}} = \frac{\exp\left(-\frac{h\Delta v}{kT}\right) - \exp\left(-\frac{h\Delta v}{kT_{c0}}\right)}{\exp\left(-\frac{h\Delta v}{kT}\right) - \exp\left(-\frac{h\Delta v}{kT_{c1}}\right)}; \quad (6)$$

resolving formula (6) to obtain $$T = \left\{\ln\left[\frac{\left(\frac{\phi_a}{\phi_s} - \frac{\phi_{a0}}{\phi_{s0}} / \frac{\phi_a}{\phi_s} - \frac{\phi_{a1}}{\phi_{s1}}\right) \exp\left(-\frac{h\Delta v}{kT_{c1}}\right) - \exp\left(-\frac{h\Delta v}{kT_{c0}}\right)}{\left(\frac{\phi_a}{\phi_s} - \frac{\phi_{a0}}{\phi_{s0}} / \frac{\phi_a}{\phi_s} - \frac{\phi_{a1}}{\phi_{s1}}\right) - 1}\right]\left(-\frac{k}{h\Delta v}\right)\right\}^{-1}. \quad (7)$$

Compared with the existing distributed fiber sensing systems, the self-calibration temperature detection device and temperature demodulation method oriented to a fiber Raman sensing system as described in the present disclosure have following advantages:

Firstly, the present disclosure inventively uses two calibration data and temperature measurement data to perform temperature demodulation without adding any components, avoiding the influence of Rayleigh noises on the temperature measurement results, and it is expected to make the temperature measurement precision reach in ±0.1° C.

Secondly, the calibration stage of the present disclosure is performed at an early stage of the measurement stage, and after the calibration is completed, there is no need to repeat the calibration during the subsequent measurement period, thereby speeding up a more convenient industrialization process of the distributed fiber sensing system.

The present disclosure is reasonable in design, and effectively resolves the problem of low temperature measuring precision of the system caused by Rayleigh light crosstalk in the existing distributed fiber Raman temperature measurement systems, and it is expected to make the temperature measurement precision reach in ±0.1° C., being suitable for the distributed fiber Raman temperature measuring system.

BRIEF DESCRIPTION OF THE DRAWINGS

FIG. 1 shows a schematic diagram of a high-precision detection device oriented to a distributed fiber Raman sensing system of the present disclosure.

1—pulse laser; 2—WDM (wavelength division multiplexer 1550 nm/1450 nm/1650 nm); 3—to-test sensing fiber; 4—first APD; 5—second APD; 6—first LNA; 7—second LNA; 8—high-data acquisition card; 9—computer.

DETAILED DESCRIPTION

Embodiments of the present disclosure will be described in detail below with reference to the drawings.

A high-precision temperature demodulation method oriented to a distributed fiber Raman sensing system is implemented by a following device. The device includes a 1550 nm high-power pulsed laser, a WDM, two APDs, two LNAs, a sensing fiber to be tested (ordinary multi-mode fiber), a data acquisition card, and a computer.

The method is divided into following four steps.

Step 1: Constructing a High-Precision Temperature Detection Device Oriented to a Distributed Fiber Raman Sensing System.

As shown in FIG. 1, a fiber Raman thermodetector includes a pulsed laser, a WDM, two APDs, two LNAs, a data acquisition card, and a computer; wherein an output end of the pulsed laser 1 is connected to an input end of the WDM 2. An input end of the sensing fiber to be tested 3 is connected to a common end of the WDM 2. Two output ends of the WDM 2 are respectively connected to input ends of a first APD 4 and a second APD 5; an output end of the first APD 4 is connected to an input end of a first LNA 6; an output end of the second APD 5 is connected to an input end of a second LNA 7; output ends of the first LNA 6 and the second LNA 7 are connected to input ends of the data acquisition card 8; and an output end of the data acquisition card 8 is connected to an input end of the computer 9.

In specific implementation, the pulsed laser has a wavelength of 1550 nm, a pulse width of 10 ns, and a repetition frequency of 8 KHz. The operating wavelength of the WDM is 1550 nm/1450 nm/1663 nm. The APD has a bandwidth of 100 MHz, and a spectral response range of 900-1700 nm. The bandwidth of the LNA is 100 MHz. The data acquisition card has four channels, a sampling rate of 100M/s and a bandwidth of 100 MHz. The sensing fiber to be tested is an ordinary multi-mode fiber.

Step 2: Processing Stokes Light and Anti-Stokes Light Signals in a Calibration Stage.

Starting the fiber Raman thermodetector, and transmitting laser pulses emitted by the high-power pulsed laser to the sensing fiber to be tested; conducting spontaneous Raman scattering when the laser pulses propagate in the sensing fiber to be tested, thereby enabling Stokes light and anti-Stokes light to be generated at each position of the multi-mode sensing fiber.

The Stokes light is incident on the data acquisition card successively via the WDM, the first APD, and the first LNA, and the data acquisition card performs an analog-digital conversion on the Stokes light and obtains a light intensity curve of the Stokes light.

The anti-Stokes light is incident on the data acquisition card successively via the WDM, the second APD, and the second LNA, and the data acquisition card performs an analog-digital conversion on the anti-Stokes light and obtains a light intensity curve of the anti-Stokes light.

Before temperature measurement, it is necessary to perform a calibration processing for all of the sensing fiber at a constant temperature, and the calibration processing is carried out twice in total during the calibration stage. In a first calibration stage, the data acquisition card obtains a backscattering light intensity curve of the anti-Stokes light and Stokes light, and the light intensity ratio between the anti-Stokes light and Stokes light is expressed as:

$$\frac{\phi_{a0}}{\phi_{s0}} = \frac{K_a V_a^4}{K_s V_s^4} \exp\left(-\frac{h\Delta v}{kT_{c0}}\right) \exp[(\alpha_s - \alpha_a)l] + P_0 K_r V_0^4 \exp(-2\alpha_o l), \quad (8)$$

where $K_s$, $K_a$ and $K_r$ are coefficients related to a scattering end cross section of the fiber; $V_s$, $V_a$ and $V_0$ are frequencies of Stokes light, anti-Stokes light and incident light; h and k are Planck Constant and Boltzmann Constant respectively; $\Delta v$ is a Raman frequency offset of the fiber, which is 13.2 THz; $\alpha_s$, $\alpha_a$, $\alpha_0$ are attenuation coefficients of the Stokes light, anti-Stokes light and Rayleigh scattering light per unit length of the fiber, respectively; $T_{c0}$ represents a temperature value of the sensing fiber to be tested in the first calibration stage; l represents a distance between the position and a front end of the multi-mode sensing fiber; and $P_0$ is intensity of incident light.

In a second calibration stage, the data acquisition card obtains the backscattering light intensity curve of the anti-Stokes light and Stokes light, and the light intensity ratio between the anti-Stokes light and Stokes light is expressed as:

$$\frac{\phi_{a1}}{\phi_{s1}} = \frac{K_a V_a^4}{K_s V_s^4} \exp\left(-\frac{h\Delta v}{kT_{c1}}\right) \exp[(\alpha_s - \alpha_a)l] + P_0 K_r V_0^4 \exp(-2\alpha_o l), \quad (9)$$

where $T_{c1}$ represents the temperature value of the sensing fiber to be tested in the second calibration stage.

Step 3: Processing the Stokes Light and Anti-Stokes Light Signals in a Measurement Stage In the measurement stage, the data acquisition card obtains the backscattering light intensity curve of the anti-Stokes light and Stokes light, and the light intensity ratio between the anti-Stokes light and Stokes light may be expressed as:

$$\frac{\phi_a}{\phi_s} = \frac{K_a V_a^4}{K_s V_s^4} \exp\left(-\frac{h\Delta v}{kT}\right) \exp[(\alpha_s - \alpha_a)l] + P_0 K_r V_0^4 \exp(-2\alpha_o l), \quad (10)$$

where T represents the temperature value at a position l of the sensing fiber to be tested in the measurement stage.

Step 4: A High-Precision Temperature Demodulation Method Oriented to a Distributed Fiber Raman Sensing System A following formula can be obtained by subtracting formula (8) from formula (10):

$$\frac{\phi_a}{\phi_s} - \frac{\phi_{a0}}{\phi_{s0}} = \frac{K_a V_a^4}{K_s V_s^4} \exp[(\alpha_s - \alpha_a)l]\left[\exp\left(-\frac{h\Delta v}{kT}\right) - \exp\left(-\frac{h\Delta v}{kT_{c0}}\right)\right]. \quad (11)$$

A following formula can be obtained by subtracting formula (9) from formula (10):

$$\frac{\phi_a}{\phi_s} - \frac{\phi_{a1}}{\phi_{s1}} = \frac{K_a V_a^4}{K_s V_s^4} \exp[(\alpha_s - \alpha_a)l]\left[\exp\left(-\frac{h\Delta v}{kT}\right) - \exp\left(-\frac{h\Delta v}{kT_{c1}}\right)\right]. \quad (12)$$

A following formula can be obtained by making a ratio of formula (12) to formula (11):

$$\frac{\frac{\phi_a}{\phi_s} - \frac{\phi_{a0}}{\phi_{s0}}}{\frac{\phi_a}{\phi_s} - \frac{\phi_{a1}}{\phi_{s1}}} = \frac{\exp\left(-\frac{h\Delta v}{kT}\right) - \exp\left(-\frac{h\Delta v}{kT_{c0}}\right)}{\exp\left(-\frac{h\Delta v}{kT}\right) - \exp\left(-\frac{h\Delta v}{kT_{c1}}\right)}. \tag{13}$$

After formula (13) is resolved, a follow formula may be obtained:

$$T = \left\{\ln\left\{\frac{\left(\frac{\phi_a}{\phi_s} - \frac{\phi_{a0}}{\phi_{s0}} \Big/ \frac{\phi_a}{\phi_s} - \frac{\phi_{a1}}{\phi_{s1}}\right)\exp\left(-\frac{h\Delta v}{kT_{c1}}\right) - \exp\left(-\frac{h\Delta v}{kT_{c0}}\right)}{\left(\frac{\phi_a}{\phi_s} - \frac{\phi_{a0}}{\phi_{s0}} \Big/ \frac{\phi_a}{\phi_s} - \frac{\phi_{a1}}{\phi_{s1}}\right) - 1}\right\}\left(-\frac{k}{h\Delta v}\right)\right\}^{-1}. \tag{14}$$

Finally, it should be noted that the above embodiments are only used to illustrate the technical solutions of the present disclosure rather than limiting, and although detailed descriptions have been made with reference to the embodiments of the present disclosure, it should be understood for those skilled of the art that modifications or equivalent replacements to the technical solutions of the present disclosure do not depart from the spirit and scope of the technical solutions of the present disclosure, and should be covered by the scope of the claims of the present disclosure.

What is claimed is:

1. A high-precision temperature demodulation method oriented to a distributed fiber Raman sensor, characterized in comprising the following steps: Step 1: constructing a high-precision temperature detection device oriented to a distributed fiber Raman sensing system comprising a pulsed laser, an output end of the pulsed laser being connected to an input end of a Raman wavelength division multiplexer; two output ends of the WDM being respectively connected to input ends of a first Avalanche Photodiode (APD) and a second APD; an output end of the first APD being connected to an input end of a first Low-Noise Amplifier (LNA); an output end of the second APD being connected to an input end of a second LNA; output ends of the first LNA and the second LNA being connected to input ends of a data acquisition card; an output end of the data acquisition card being connected to an input end of a computer; a common end of the WDM being connected to an input end of a sensing fiber to be tested; Step 2: processing Stokes light and anti-Stokes light signals in a calibration stage transmitting laser pulses emitted by the pulsed laser to the sensing fiber to be tested; conducting spontaneous Raman scattering when the laser pulses propagate in a multi-mode sensing fiber, such that Stokes light and anti-Stokes light are generated at each position of the multi-mode sensing fiber; wherein backward Stokes light and anti-Stokes light generated in the fiber firstly respectively arrive at the first APD, the first LNA, and the second APD, the second LNA via the WDM, and are performed a photoelectric conversion and amplification, finally, enter the high-speed acquisition card and computer to acquire data to obtain positional and light intensity information of the Stokes light and anti-Stokes light along the fiber; before temperature measurement, performing a calibration processing for all of the sensing fiber to be tested at a constant temperature, and the calibration process being carried out twice in total in a calibration stage; in a first calibration stage, obtaining, by the data acquisition card, a backscattering light intensity curve of the anti-Stokes light and the Stokes light, whose light intensity ratio is expressed as:

$$\frac{\phi_{a0}}{\phi_{s0}} = \frac{K_a V_a^4}{K_s V_s^4}\exp\left(-\frac{h\Delta v}{kT_{c0}}\right)\exp[(\alpha_s - \alpha_a)l] + P_0 K_r V_0^4 \exp(-2\alpha_o l) \tag{1}$$

where Ks, Ka and Kr are coefficients related to a scattering end cross section of the fiber; Vs, Va and Vo are frequencies of the Stokes light, anti-Stokes light and incident light; h and k are Planck Constant and Boltzmann Constant respectively; 4v is a Raman frequency offset of the fiber, which is 13.2 THz; as, aa, ao are attenuation coefficients of the Stokes light, anti-Stokes light and Rayleigh scattering light per unit length of the fiber, respectively; Teo represents a temperature value of the sensing fiber to be tested in the first calibration stage; / represents a distance between the position and a front end of the multi-mode sensing fiber; and Po is intensity of incident light; in a second calibration stage, obtaining, by the data acquisition card, the backscattering light intensity curve of the anti-Stokes light and the Stokes light, whose light intensity ratio is expressed as:

$$\frac{\phi_{a1}}{\phi_{s1}} = \frac{K_a V_a^4}{K_s V_s^4}\exp\left(-\frac{h\Delta v}{kT_{c1}}\right)\exp[(\alpha_s - \alpha_a)l] + P_0 K_r V_0^4 \exp(-2\alpha_a l), \tag{2}$$

where Tai represents the temperature value of the sensing fiber to be tested in the second calibration stage; Step 3: processing the Stokes light and anti-Stokes light signals in a measurement stage in the measurement stage, obtaining, by the data acquisition card, the backscattering light intensity curve of the anti-Stokes light and the Stokes light, whose light intensity ratio is expressed as:

$$\frac{\phi_a}{\phi_s} = \frac{K_a V_a^4}{K_s V_s^4}\exp\left(-\frac{h\Delta v}{kT}\right)\exp[(\alpha_s - \alpha_a)l] + P_0 K_r V_0^4 \exp(-2\alpha_o l). \tag{3}$$

where T represents the temperature value at a position 1 of the sensing fiber to be tested in the measurement stage; Step 4: a high-precision temperature demodulation method oriented to a distributed fiber Raman sensing system subtracting formula (1) from formula (3) to obtain:

$$\frac{\phi_a}{\phi_s} - \frac{\phi_{a0}}{\phi_{s0}} = \frac{K_a V_a^4}{K_s V_s^4}\exp[(\alpha_s - \alpha_a)l]\left[\exp\left(-\frac{h\Delta v}{kT}\right) - \exp\left(-\frac{h\Delta v}{kT_{c0}}\right)\right] \tag{4}$$

subtracting formula (2) from formula (3) to obtain:

$$\phi_a/\phi_s - \phi_{a1}/\phi_{s1} = K_a V_a^4/K_s V_s^4 \exp[(\alpha_s-\alpha_a)l]\left[\exp(-h\Delta v/kT) - \exp(-h\Delta v/kT_{c1})\right] \tag{5}$$

making a ratio of formula (4) to formula (5) to obtain:

$$\frac{\frac{\phi_a}{\phi_s} - \frac{\phi_{a0}}{\phi_{s0}}}{\frac{\phi_a}{\phi_s} - \frac{\phi_{a1}}{\phi_{s1}}} = \frac{\exp\left(-\frac{h\Delta v}{kT}\right) - \exp\left(-\frac{h\Delta v}{kT_{c0}}\right)}{\exp\left(-\frac{h\Delta v}{kT}\right) - \exp\left(-\frac{h\Delta v}{kT_{c1}}\right)}; \quad (6)$$

resolving formula (6) to obtain:

$$T = \left\{ \ln\left\{ \frac{\left(\frac{\phi_a}{\phi_s} - \frac{\phi_{a0}}{\phi_{s0}} \Big/ \frac{\phi_a}{\phi_s} - \frac{\phi_{a1}}{\phi_{s1}}\right)\exp\left(-\frac{h\Delta v}{kT_{c1}}\right) - \exp\left(-\frac{h\Delta v}{kT_{c0}}\right)}{\left(\frac{\phi_a}{\phi_s} - \frac{\phi_{a0}}{\phi_{s0}} \Big/ \frac{\phi_a}{\phi_s} - \frac{\phi_{a1}}{\phi_{s1}}\right) - 1} \right\} \left(-\frac{k}{h\Delta v}\right) \right\}^{-1}. \quad (7)$$

2. The high-precision temperature demodulation method oriented to a distributed fiber Raman sensor of claim 1, characterized in that:
the pulsed laser has a wavelength of 1550 nm, a pulse width of 10 ns, and a repetition frequency of 8 KHz;
an operating wavelength of the WDM is 1550 nm/1450 nm/1663 nm;
the APD has a bandwidth of 100 MHz and a spectral response range of 900-1700 nm;
a bandwidth of the LNA is 100 MHz;
the data acquisition card has four channels, a sampling rate of 100M/s and a bandwidth of 100 MHz; and
the sensing fiber to be tested is an ordinary multi-mode fiber.

\* \* \* \* \*